United States Patent [19]
Bellei et al.

[11] 3,804,215
[45] Apr. 16, 1974

[54] SPOT-TYPE DISC BRAKE
[75] Inventors: Hans Albert Bellei, Bad Vilbel; Jochen Burgdorf, Offenbach, both of Germany
[73] Assignee: ITT Industries, Inc., New York, N.Y.
[22] Filed: May 2, 1973
[21] Appl. No.: 356,647

Related U.S. Application Data
[63] Continuation of Ser. No. 248,776, April 28, 1972, which is a continuation of Ser. No. 70,446, Sept. 8, 1970, abandoned.

[30] Foreign Application Priority Data
Sept. 10, 1969  Germany............................ 1945767

[52] U.S. Cl. ............................................. 188/73.4
[51] Int. Cl. .......................................... F16d 55/224
[58] Field of Search.................. 188/73.3, 73.4, 73.5

[56] References Cited
UNITED STATES PATENTS
3,134,459  5/1964  Burnett et al...................... 188/73.4
3,166,159  1/1965  Burnett............................... 18/73.4
3,207,268  9/1965  Mossey .............................. 188/73.4
3,245,500  4/1966  Hambling et al. ................. 188/73.4

FOREIGN PATENTS OR APPLICATIONS
1,130,208  10/1968  Great Britain...................... 188/73.4
1,239,531  4/1967  Germany............................ 188/73.4

Primary Examiner—George E. A. Halvosa
Assistant Examiner—Edward R. Kazenske
Attorney, Agent, or Firm—John T. O'Halloran; Menotti J. Lombardi, Jr.; Alfred C. Hill

[57] ABSTRACT
This spot-type disc brake for vehicles has a fixed carrier extended over a brake disc, brake shoes slidably mounted on the carrier and a slidable frame having sides which engage slots in the carrier to transmit the actuating force from an actuating cylinder and brake shoe on one side of the disc to the brake shoe on the other side of the disc. The guide surfaces on the carrier are curved about an axis normal to the plane of the frame to reduce the contact area between the frame and the carrier and allow limited tilting of the frame.

1 Claim, 2 Drawing Figures

SPOT-TYPE DISC BRAKE

CROSS-REFERENCE TO RELATED APPLICATIONS

This is a continuation of application Ser. No. 248,776 filed Apr. 28, 1972 which in turn is a continuation of application Ser. No. 70,446 filed Sept. 8, 1970, now abandoned.

BACKGROUND OF THE INVENTION

Our copending application Ser. No. 8,177, filed on Feb. 3, 1970, discloses a spot-type disc brake for road vehicles with a rotating brake disc, a non-rotating brake carrier which overlaps the edge of the brake disc, and with an opening to receive the brake shoes, and a floatingly arranged frame protruding over the brake disc and transmitting the operating force of a hydraulic actuator arranged on one side of the brake disc and acting directly upon a brake shoe, to the brake shoe arranged on the opposite side of the brake disc, the frame on one side of the brake disc being guided by axially extending surfaces on the brake carrier along which the sides of the frame slide from each other.

The guides between the frame and the brake carrier of such spot-type disc brakes enable the frame to move in an axial direction with respect to the brake carrier. To avoid chatter and rattling of the parts movable against each other as a result of the vibrations, the clearance between the frame and guide surfaces on the carrier should be very small. However, guides with minimum tolerances are susceptible to corrosion and become jammed very easily. Frame guides, particularly of spot-type disc brakes of the type referred to above, are highly susceptible to jamming since the brake shoe opposite the adjusting device can move between the supporting surfaces of the brake carrier during initiation of the braking process due to the manufacturing tolerances of said brake shoe, said movements being transmitted to the frame and causing the latter to be tilted in its plane at a small angle. Moreover, the jamming effect on the brakes for each wheel may vary causing the vehicle to swerve during braking.

SUMMARY OF THE INVENTION

An object of the invention is to provide a guide between the frame and the brake carrier of spot-type disc brakes of the type referred to above, said guide allowing smaller tolerances to be maintained without thereby increasing the sensitivity of the guide with respect to jamming and corrosion.

This is achieved by providing curved surfaces on either the brake carrier or the frame where the surface contacts the guide surface on the other part. This provides a "line" contact on each side of the disc rather than an "area" contact as disclosed in the copending application referred to above. Thereby the frame is allowed to perform a limited tilting movement in its plane whereby the movement transmitted to the frame by the brake shoe opposite the actuating device, is absorbed and not transmitted to the guide. In addition to this, deformations to which the frame or the brake carrier are exposed during full-power braking, are balanced and do not cause a jamming of the frame guide. Furthermore, the contact surface between the frame and the brake carrier is decreased to the effect that the prejudicial effect of corrosion as regards the movability of the frame in the guide, is reduced. In addition, the attachment of the frame to the brake carrier is facilitated since the curved guiding surfaces on the frame or the brake carrier respectively facilitate the insertion of the guide members of the frame into the respective members of the brake carrier.

In a preferred embodiment of the invention, grooves of rectangular cross-section can be provided in the brake carrier to guide the frame in said brake carrier. The frame engages the mentioned grooves, the bottom surfaces of which are curved with respect to the plane counter-surface on the frame. Thus, a guide of the type described can be manufactured easily and includes the advantages referred to above. The grooves in the brake carrier can be manufactured simply and economically by turning, in that both grooves can be turned out in one setting, and the distance of the bottom surfaces of the grooves from each other can be kept within a small range of tolerance. The two surfaces have a common center whereby even major tilting movements of the frame are balanced.

A BRIEF DESCRIPTIONS OF THE DRAWINGS

FIG. 1 is a plan view, partially broken away, of a spot-type disc brake embodying the present invention; and FIG. 2 is a sectional view taken along the line 2—2 of FIG. 1.

DESCRIPTION OF THE PREFERRED EMBODIMENT

Figure 1:
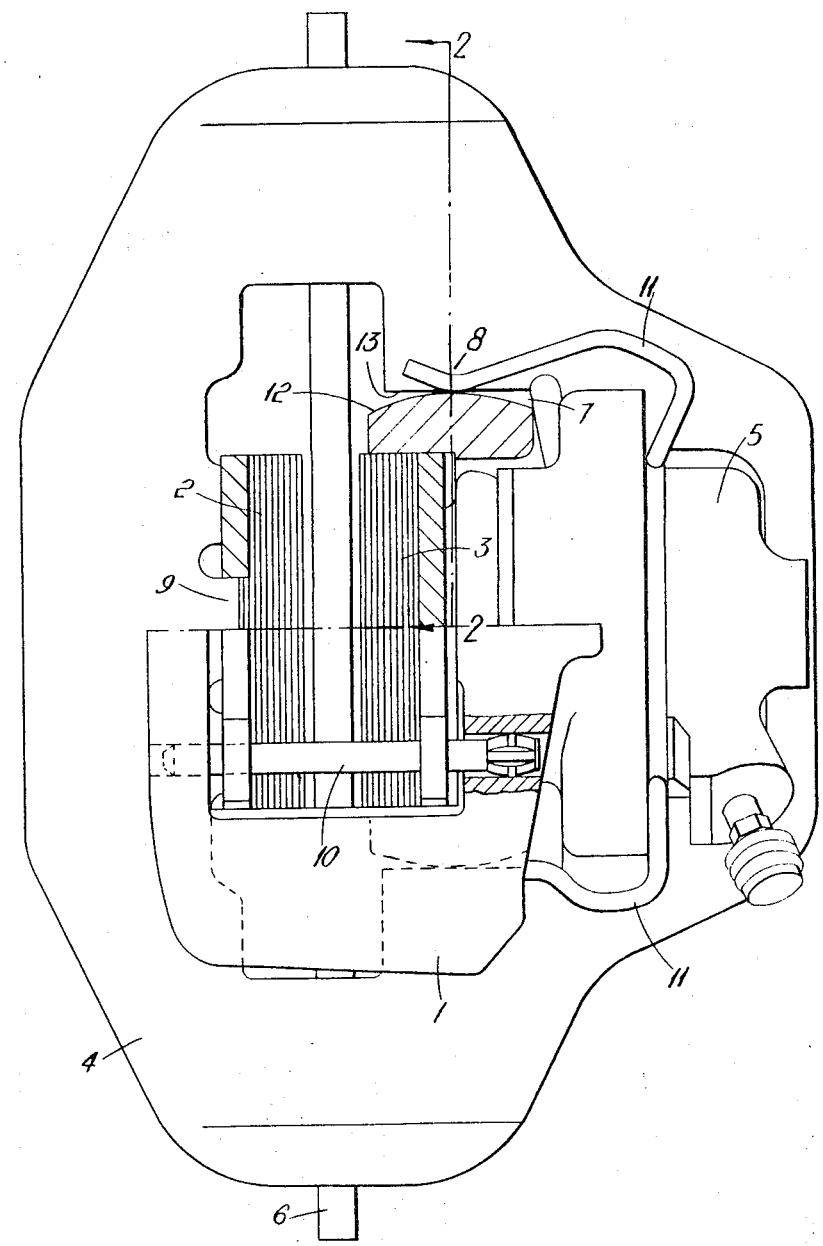
Figure 2:
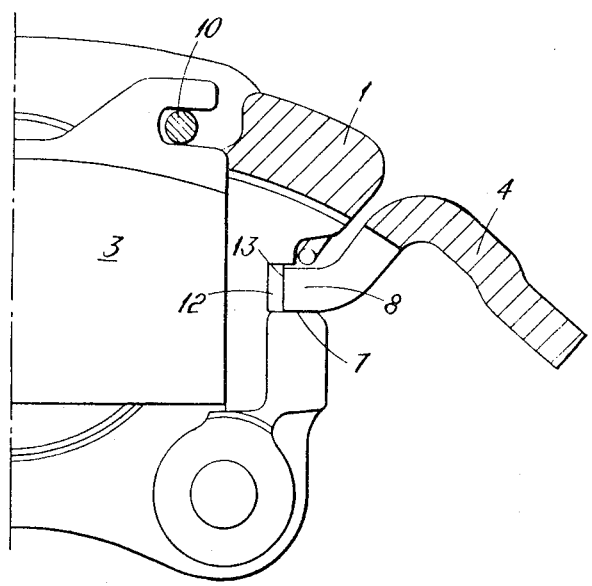

The copending application referred to hereinabove is incorporated by reference and should be referred to for a detailed description of the type of brake for which this invention is an improvement.

Referring now to the figures, the spot-type disc brake shown consists of the brake carrier 1 which provides a central opening in order to receive and to support the brake shoes 2, 3 consisting of the frictional lining and the backing plate. The brake carrier 1 is encircled by the frame 4 which transmits the applying forces produced by the hydraulic actuating cylinder 5 during braking to the brake shoe 2 via the brake disc 6, said hydraulic actuating cylinder being arranged between the frame 4 and the brake shoe 3. The frame is held and supported by two grooves 7 provided in the brake carrier 1, said grooves being engaged by the parts 8 of the frame. On the side of the brake disc opposite the actuating cylinder 5, the frame 4 with its pin 9 engages a recess located in the backing plate of the brake shoe 2, the latter being held in the central opening of the brake carrier 1 together with the brake shoe 3 by means of pins 10. A spring 11 clamped between the brake carrier and the frame prevents an unintentional to-and-fro sliding motion of the frame in its guide and inhibits rattling.

The grooves 7 are turned so as to prevent compulsive forces arising in the guide of the frame 4 on the brake carrier 1. The bottom surfaces 12 of said grooves are curved with respect to the respective guiding surfaces 13 on the frame 4. This enables the frame 4 to tilt around an axis which extends vertically to the plane of said frame whereby the tolerances in the guide of the frame remain constant irrespective of the position of the frame.

While we have described above the principles of our invention in connection with specific apparatus it is to be clearly understood that this description is made only by way of example and not as a limitation to the scope of our invention as set forth in the accompanying claims.

We claim:
1. A spot-type disc brake comprising:

a rotatable brake disc rotating about a first axis;

a brake carrier having a first central opening in a surface thereof parallel to said first axis, said first opening embracing the edge of said disc, said brake carrier being incapable of rotation with respect to said brake disc and said axis and of movement parallel to said first axis;

a pair of brake shoes, each of said brake shoes being slid into said first central opening toward said first axis, each of said brake shoes being mounted in said carrier to enable movement of said brake shoes parallel to said first axis to enable engagement with said brake disc upon braking, one of said brake shoes being disposed on one side of said brake disc in parallel relation therewith and the other of said brake shoes being disposed on the other side of said brake disc in parallel relation therewith;

an actuator slidably supported by said carrier disposed on said one side of said brake disc, said actuator acting directly on said one of said brake shoes;

a frame disposed in a first plane parallel to said first axis, said framing having a second central opening to embrace both said brake disc and said carrier, a first portion of said frame adjacent said second central opening disposed on said one side of said brake disc and parallel to the surface of said brake disc engaging and supporting said actuator to dispose said actuator between said one of said brake shoes and said frame and a second portion of said frame adjacent said second central opening disposed on said other side of said brake disc and parallel to the surface of said brake disc, said second portion being spaced from said first portion and engaging said other of said brake shoes to support said frame on said other side of said brake disc and to enable said frame to transmit the operating force of said actuator to said other of said brake shoes; and a pair of rectangular grooves formed in opposite outer surfaces of said carrier in spaced relation with respect to each other and said first axis, each of said grooves being on one side of said brake disc; each of said grooves being disposed in a second plane parallel to said first axis, said first and second planes having a predetermined relationship; each of said grooves having a bottom and two side walls, said two side walls of each of said grooves slidably engaging the upper and lower surfaces of a third portion of said frame parallel to said first axis adjacent said second opening and said bottom of each of said grooves slidably engaging the edge of an associated one of said third portions of said frame to enable movement of said frame parallel to said first axis relative to said carrier and said brake disc and to support said frame on said one side of said brake disc, said bottom of each of said grooves having a semi-circular configuration about a second axis spaced from and perpendicular to said first axis to permit limited rotation of said frame and said brake shoes about a third axis perpendicular to said first axis and said first plane and parallel to said second axis upon brake actuation until said brake shoes engage said brake carrier so that circumferential friction forces imparted to said brake shoes by said brake disc are applied directly to said brake carrier only to prevent stresses due to said friction forces from being applied to said frame and said actuator and thereby prevent jamming of said frame in said grooves.

* * * * *